United States Patent
Brückner et al.

(10) Patent No.: US 7,829,647 B2
(45) Date of Patent: Nov. 9, 2010

(54) PROCESS FOR THE PREPARATION OF BRANCHED POLYORGANOSILOXANES

(75) Inventors: Arndt Brückner, Mülheim a.d. Ruhr (DE); Carsten Schiller, Mülheim a.d. Ruhr (DE); Christian Mund, Essen (DE)

(73) Assignee: Evonik Goldschmidt GmbH (DE)

( * ) Notice: Subject to any disclaimer, the term of this patent is extended or adjusted under 35 U.S.C. 154(b) by 335 days.

(21) Appl. No.: 12/187,649

(22) Filed: Aug. 7, 2008

(65) Prior Publication Data

US 2009/0043001 A1  Feb. 12, 2009

(30) Foreign Application Priority Data

Aug. 7, 2007  (DE)  ........................ 10 2007 037 292

(51) Int. Cl.
*C08G 77/06* (2006.01)
*C08G 77/04* (2006.01)
*C08G 77/12* (2006.01)

(52) U.S. Cl. .............................. 528/14; 528/29; 528/31

(58) Field of Classification Search .................. 528/14, 528/29, 31
See application file for complete search history.

(56) References Cited

U.S. PATENT DOCUMENTS

| 3,372,133 | A | * | 3/1968 | Krantz | 524/588 |
| 3,398,177 | A | * | 8/1968 | Franklin | 556/431 |
| 4,202,831 | A | * | 5/1980 | Schlak et al. | 556/467 |
| 6,284,908 | B1 | * | 9/2001 | Loy et al. | 556/467 |
| 7,053,166 | B2 | | 5/2006 | Brehm et al. | |
| 2004/0138399 | A1 | | 7/2004 | MacKinnon et al. | |
| 2006/0241268 | A1 | * | 10/2006 | Ochs | 528/15 |
| 2006/0241269 | A1 | * | 10/2006 | Ochs | 528/15 |

FOREIGN PATENT DOCUMENTS

EP  1 460 098  9/2004

OTHER PUBLICATIONS

Walter Noll "Chemie Und Technologie der Silicone" 1968, pp. 163-208 plus cover page.*
Walter Noll "Chemistry and Technology of Silicones" 1968, pp. 1-42 plus cover page.*

* cited by examiner

*Primary Examiner*—Randy Gulakowski
*Assistant Examiner*—Robert Loewe
(74) *Attorney, Agent, or Firm*—Frommer Lawrence & Haug LLP

(57) ABSTRACT

The invention relates to a process for the preparation of branched siloxanes containing $R\text{—}SiO_{3/2}$ units, where R=organic radical, wherein straight-chain polysiloxanes containing silane hydrogen in the polymer chain are reacted in the presence of ammonium or metal carboxylates as a catalyst in the absence of hydroxy-functional organic compounds, and to siloxanes thus prepared and the use thereof in the preparation of polyurethane foams and antifoam formulations.

14 Claims, No Drawings

PROCESS FOR THE PREPARATION OF BRANCHED POLYORGANOSILOXANES

This application claims benefit under 35 U.S.C. 119(a) of German patent application DE 10 2007 037 292.4, filed on 7 Aug. 2007.

Any foregoing applications, including German patent application DE 10 2007 037 292.4, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to a process for the preparation of branched siloxanes from straight-chain polysiloxanes containing silane hydrogen in the polymer chain.

Owing to their unique properties, such as water repellency, interfacial activity, thermal stability, etc., siloxanes are used in numerous technical applications. These include the stabilization of polyurethane foams, use as emulsifiers, in release coatings and many others.

As a rule, these siloxanes have a linear or branched structure which is modified terminally or in a comb-like manner. Branched siloxanes are of interest for a multiplicity of applications. Thus, for example, European patent EP 0 025 822 (U.S. Pat. No. 4,355,171) describes the use of branched siloxanes for the preparation of polyurethane foam.

Branched siloxanes can be prepared according to the prior art by cohydrolysis of trifunctional silanes and of siloxanes. Thus, European patent application EP 1 172 397 (U.S. Pat. No. 6,573,355) describes the acid-catalyzed reaction of trialkoxysilanes with disiloxanes and subsequent alkaline equilibration with cyclotetrasiloxanes. European patent EP 0 019 251 (U.S. Pat. No. 4,281,144) describes the reaction of trichlorosilanes with cyclotetrasiloxanes. Weber et al. describe the preparation of branched siloxanes by anionic ring-opening polymerization of silyloxy-modified cyclotrisiloxanes (W. P. Weber, J. K. Paulasaari, G. Cai, Synthesis of Linear Copolymers with Regular Microstructures and Synthesis of Soluble Polysiloxanes with Trifunctional $RSiO_{3/2}$ (T) or Tetrafunctional $SiO_{4/2}$ (Q) Units, chapter 7, in S. J. Clarson et al., Synthesis and Properties of Silicone and Silicone-Modified Materials, American Chemical Society 2003).

The formation of the T-units which branch the siloxane chain from alkyl-$Si(H)O_{2/2}$ units by the action of tris(pentafluorophenyl)borane is disclosed in patent application US 2006/0211836. Here, solid gels are obtained which, however, are not suitable for the typical fields of use of organo-modified siloxanes.

Patent application WO 01/74938 (US Pub. 2003-139287) describes the formation of T-units by dehydrogenative condensation of SiOH-containing siloxanes with SiH-containing siloxanes by catalysis with boron-containing compounds. Firstly, the toxicity of the boron-containing compounds remaining in the product and secondly the fact that the products are crosslinked gels whereas liquid, uncrosslinked products are required for the initially mentioned applications for silicone additives are disadvantages of this process.

The formation of T-units which branch the siloxane chain from $HSi(Me_2)O_{1/2}$ siloxane chain ends as a secondary reaction in transition metal-catalyzed hydrosilylation reactions is known from X. He, A. Lapp, J. Herz, Makromol. Chem. 1988, 189, 1061-1075.

Gustavson et al. describe rearrangement reactions of siloxanes carrying silane hydrogen in the presence of transition metal complexes of platinum, of palladium, of iridium and of rhodium (W. A. Gustavson, P. S. Epstein, M. D. Curtis, J. Organomet. Chem. 1982, 238, 87-97). Thus, they observed the formation of T-units under the action of $(Ph_3P)_2(CO)ClIr$ on 1,1,1,2,3,4,4,4-octamethyltetrasiloxane.

Since the transition metal complexes are toxicologically unsafe and moreover are used in relatively high concentrations, there is a need for transition metal-free catalysts for the technically implementable formation of T-units.

The formation of T-units by the action of carboxylates on siloxanes containing silane hydrogen is unknown to date, even in the absence of hydroxy-functional compounds. According to the prior art, carboxylates in the presence of hydroxy-functional compounds catalyze the linkage of these hydroxy-functional compounds to the units of the siloxane which carry silane hydrogen with formation of $R—Si(OR')O_{2/2}$ units ($T^{OR}$-units, R and R'=organic radicals). Thus, European patent EP 1 460 098 (U.S. Pat. No. 7,053,166) describes a process in which organically modified polyorganosiloxanes are prepared by reaction of hydrogensiloxanes with alcohols in a dehydrogenative condensation with linkage of $T^{OR}$-units with a catalytic amount of a mixture of an organic acid and its salt.

EP 0 475 440 (U.S. Pat. No. 5,147,965) describes a process in which hydrogensiloxanes are reacted with an alcohol with addition of an organic acid in the presence of a Pt salt. For the reaction, it is essential that both large amounts of organic acid (from 0.1 to 1 mol, based on alcohol), toluene as a solvent and a platinum salt are used. T-units are not formed thereby.

J. Boyer, R. J. P. Corriu, R. Perz, C. Reye, *J. Organomet. Chem.* 1978, 157, 153-162, describes a process for the alcoholysis of silanes in the presence of equimolar amounts of salts, such as, for example, potassium tartrate, phthalate or formate. $T^{OP}$-units are formed thereby and not T-units.

U.S. Pat. No. 6,284,908 describes a process in which tetraalkyl-ammonium hydroxides, alkali metal hydroxides or alkaline earth metal hydroxides are used as catalysts of the disproportionation of hydrogen siloxanes to give polysilsesquioxanes $(RSiO_{3/2})_n$ and oligohydrosilanes. Gels or gel-like solids form within minutes and volatile silanes are liberated.

Disadvantages of the processes of the prior art are that the processes are complicated and require the handling of hydrolysis-sensitive silanes. In addition, the hydrolysis of chlorosilanes is accompanied by the liberation of aggressive hydrogen chloride, which limits handling to corrosion-resistant plants and leads to ecological problems. It is therefore desirable as far as possible to avoid the handling of silanes in the preparation of specialty chemicals and to limit it to preparation of inexpensive polysiloxanes.

It was therefore the object to provide a technically simple and economical process which makes it possible to prepare branched siloxanes having $R—SiO_{3/2}$ units (T-units, R=an organic radical) from inexpensive polysiloxanes and which preferably does not have one or more of the disadvantages of the processes of the prior art.

Surprisingly, it was found that the same can be achieved by the reaction of a straight-chain siloxane containing silane hydrogen in the polymer chain with ammonium or metal carboxylates as effective catalysts.

The present invention therefore relates to a process for the preparation of branched siloxanes containing $R—SiO_{3/2}$ units, where R=organic radical, wherein straight-chain polysiloxanes containing silane hydrogen in the polymer chain are reacted in the presence of ammonium or metal carboxylates as a catalyst in the absence of hydroxy-functional organic compounds.

The present invention also relates to siloxanes obtainable by the process according to the invention, and to the use of these siloxanes, in particular in the preparation of polyurethane foams.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

The process according to the invention has numerous advantages over processes of the prior art. In contrast to processes according to the prior art, starting from chlorosilanes, it is possible according to the invention to prepare polyorganosiloxanes which are not contaminated with hydrochloric acid originating from the substitution reaction, hydrogen chloride or chlorides corresponding to the neutralization products thereof. This considerably facilitates further processing or working-up.

Furthermore, the process according to the invention is distinguished in that no toxicologically unsafe transition metals or boron-containing compounds are used. For the purposes of this invention, the transition metals are intended to encompass elements which have partly filled d or f shells as well as elements that have partly filled d or f shells in any of their commonly occurring oxidation states. The transition elements can be subdivided into three main groups: (a) the main transition elements or d-block elements, (b) the lanthanide elements, and (c) the actinide elements and would include elements 21-30; 39-48; 57-71 and 89-112.

Furthermore, compared with the processes of the prior art, the process according to the invention has the advantage that the products obtained are as a rule flowable and are not highly crosslinked gels, which permits their use as a silicone additive for a multiplicity of applications.

The process according to the invention for the preparation of branched siloxanes and the use thereof are described by way of example below without it being intended to limit the invention to these exemplary embodiments. Where ranges, general formulae or classes of compounds are stated below, these are intended to comprise not only the corresponding ranges or groups of compounds which are explicitly mentioned but also all partial ranges and partial groups of compounds which can be obtained by removal of individual values (ranges) or compounds. Where documents are cited in the context of the present description, the content thereof is intended to be in its entirety part of the disclosure content of the present invention.

The process according to the invention for the preparation of branched siloxanes containing R—SiO$_{3/2}$ units, where R=organic radical, is distinguished in that straight-chain polysiloxanes containing silane hydrogen in the polymer chain are reacted in the presence of ammonium or metal carboxylates as a catalyst in the absence of hydroxy-functional organic compounds.

In one embodiment of the process, no transitional metal or boron compounds are used in the process or are present in the final product.

In another embodiment of the process, no volatile silane and/or hydrochloride gas/hydrochloric acid is formed.

In yet another embodiment of the process, the process of preparing branched siloxanes does not result in gel formation.

Straight-chain polysiloxanes used are preferably compounds of the general formula (I)

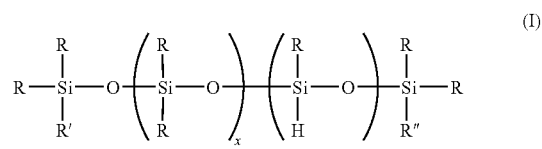

(I)

in which

R are one or more, identical or different radicals selected from linear, cyclic or branched, saturated, mono- or polyunsaturated and/or aromatic hydrocarbon radicals having up to 200 carbon atoms, which may optionally carry one or more substituents selected from the group which consists of an optionally substituted heterocyclic group preferably containing one or more nitrogen atoms, amino, alkylamino, dialkylamino, ammonium, polyether, polyester and polyether ester radicals which may optionally contain one or more groups selected from —O—, —NR$^1$—, —C(O)—, —C(S)—, —C(O)O—, C(O)OH, —C(O)NH— and —C(O)NR$^2$—, —SO$_3$H, —SO$_3^{-1}/_w$M$^{w+}$, —OSO$_3$H, —OSO$_3^{-1}/_w$M$^{w+}$, —PO$_3^{2-2}/_w$M$^{w+}$, —PO$_3$H$^{-1}/_w$M$^{w+}$, —PO$_3$H$_2$, —OPO$_3^{2-2}/_w$M$^{w+}$, —OPO$_3$H$^{-1}/_w$M$^{w+}$, —OPO$_3$H$_2$, in which R$^1$ is hydrogen or a straight-chain, cyclic or branched, saturated, unsaturated and/or aromatic, optionally bridged hydrocarbon radical having up to 50 carbon atoms, which may contain one or more groups selected from —O— and —C(O)— and in which R$^2$ is a monovalent, straight-chain, cyclic or branched, saturated, unsaturated and/or aromatic hydrocarbon radical having up to 100 carbon atoms, which may contain one or more groups selected from —O—, —NR$^1$—, —C(O)— and —C(S)—, —C(O)O—, and —C(O)NH—, and in which M$^{w+}$ is a w-valent cation where w=1, 2, 3 or 4, in particular K$^+$, Na$^+$, NH$_4^+$, (i-C$_3$H$_7$)NH$_3^+$ or (CH$_3$)$_4$N$^+$, R' and R", independently of one another, are H or R, x is an integer from 1 to 200, preferably from 2 to 100, preferably from 10 to 50, y is an integer from 1 to 100, preferably from 2 to 50, preferably from 3 to 30, and compounds are obtained which contain at least one siloxane unit of the formula (II)

RSiO$_{3/2}$ (II).

Compounds of the general formula (I) in which the radical R is identical or different, unsubstituted alkyl groups, preferably methyl groups, are optionally used as the straight-chain siloxane. Particularly preferred compounds of the general formula (I) are those in which the radicals R, R' and R" are methyl groups. Very particularly preferably used straight-chain siloxanes of the general formula (I) are those in which the radicals R, R' and R" are methyl groups and in which x is preferably from 10 to 50 and y is preferably from 2 to 100, in particular from 3 to 30.

It may be advantageous if compounds of the general formula (III)

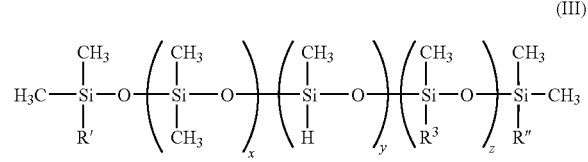
(III)

in which

R³, in each case independently of one another, are a group A-B-C,

A being a divalent group selected from linear or branched, saturated or mono- or polyunsaturated alkyl, aryl, alkylaryl or arylalkoxy groups having 1 to 20 carbon atoms, preferably a —$CH_2CH_2CH_2O$— group, B being a group of the general formula (IV)

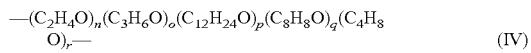
(IV)

where n, o, p, q and r, independently of one another, are integers from 0 to 50, preferably n=0 to 18, o=0 to 35 with n+o=3 to 35 and p=q=r=0 and, if more than one of the indices n, o, p, q, r>0, the general formula IV represents a random oligomer or a block oligomer, C being selected from the group consisting of linear or branched, saturated or mono- or polyunsaturated alkyl, aryl, alkylaryl or arylalkyl groups having 1 to 12 carbon atoms or acetoxy groups, preferably methyl groups, R' and R", independently of one another, are H or R³, x is an integer from 1 to 200, preferably from 2 to 100, in particular from 10 to 50, y is an integer from 1 to 100, preferably from 2 to 50, in particular from 3 to 30, are used as the straight-chain siloxane.

By using siloxanes of the general formula (III), it is possible to obtain branched polyethersiloxanes which—depending on the chosen siloxane raw materials and organomodifications—can be used as stabilizers for polyurethane foams or as antifoams. The desired polarity and the compatibility of the siloxane with the system used can be established via the radical R³.

Compounds of the general formula (III) in which the radicals R' and R" are methyl groups are preferably used as the straight-chain siloxane. Very particularly preferably used straight-chain siloxanes of the general formula (III) are those in which the radicals R' and R" are methyl groups and in which x is preferably from 10 to 50 and y is preferably from 2 to 100, in particular from 3 to 30.

Preferably, at least one compound of the general formula (V)

(V)

in which

R⁴ is selected from hydrogen or organic radicals, preferably linear, cyclic or branched, saturated, mono- or polyunsaturated and/or aromatic hydrocarbon radicals having up to 30 carbon atoms and $G^{u+}$ is a u-valent cation where u is 1, 2, 3 or 4, preferably an ammonium ion or alkali metal or alkaline earth metal cations, very particularly $K^+$, $Na^+$ or $Cs^+$, is used as catalysts in the process according to the invention.

At least one salt of at lease one of the following carboxylic acids is preferably used as the catalyst: formic acid, acetic acid, propionic acid, butyric acid, valeric acid, caproic acid, heptanoic acid, caprylic acid, nonanoic acid, capric acid, undecanoic acid, lauric acid, myristic acid, palmitic acid, stearic acid, arachidic acid, behenic acid, cyclopentane-carboxylic acid, cyclohexanecarboxylic acid, acrylic acid, methacrylic acid, vinylacetic acid, crotonic acid, 2-/3-/4-pentenoic acid, 2-/3-/4-/5-hexenoic acid, lauroleic acid, myristoleic acid, palmitoleic acid, oleic acid, gadoleic acid, sorbic acid, linoleic acid, linolenic acid, pivalic acid, ethoxyacetic acid, phenylacetic acid, lactic acid, 2-ethylhexanoic acid, oxalic acid, malonic acid, succinic acid, tartaric acid, glutaric acid, adipic acid, pimelic acid, suberic acid, azelaic acid, sebacic acid, benzoic acid, o-/m-/p-toluic acid, salicylic acid, 3-/4-hydroxybenzoic acid, phthalic acids or the completely or partly hydrogenated derivatives thereof, such as hexahydro- or tetrahydrophthalic acid, or mixtures thereof.

At least one ammonium, alkali metal or alkaline earth metal salt, preferably an alkali metal or alkaline earth metal salt of caproic acid, caprylic acid, capric acid, lauric acid, myristic acid, palmitic acid, stearic acid, arachidic acid and/or behenic acid, is preferably used as a catalyst in the process according to the invention. Particularly preferably, at least one potassium or cesium salt, preferably a cesium salt of a carboxylic acid, is used as the catalyst. Very particularly preferably, cesium stearate, potassium stearate, potassium laurate and/or cesium laurate, preferably cesium laurate, is used as the catalyst.

In the process according to the invention, the catalyst can be used homogeneously or heterogeneously. A design as a homogenized heterogeneous or heterogenized homogeneous catalysis is also possible in the context of the invention. The catalyst is preferably used homogeneously.

In the process according to the invention, the reaction can be effected in the presence of solvent or in the absence of solvent. Preferably, the reaction is carried out in the absence of solvent, which is advantageous from economic and ecological points of view, in particular in an industrial realization.

The reaction can take place among the compounds of the formulae (I) or (III) themselves or between the compounds of the formulae (I) and (III), respectively.

It may be advantageous if first straight-chain siloxanes of the formula (I) which contain silane hydrogen in the polymer chain are reacted, siloxanes which have groups carrying silane hydrogen still remaining in the reaction mixture, which siloxanes are reacted in the second process step in the course of a transition metal-catalyzed hydrosilylation reaction with one or more compounds E-A-B-L, E being a monovalent group, selected from —CH=$CH_2$ and —C≡CH and L being a hydrogen atom or the radical C, and A, B and C having the abovementioned meanings.

Siloxanes according to the invention are obtainable by the process according to the invention. These can be used for the preparation of branched siloxanes, siloxanes which contain silane hydrogen groups and were obtained by the process according to the invention being reacted with one or more compounds E-A-B-L (meaning of the radicals as above). $CH_2=CH-CH_2-O-(C_2H_4O)_n(C_3H_6O)_o$-L where n=0 to 18, o=0 to 35, n+o=3 to 35 and L=H or $CH_3$ is preferably used.

Such branched siloxanes can be prepared using siloxanes according to the invention, for example, by a procedure in which the substrate (E-A-B-L) to be hydrolyzed and a suitable hydrosilylation catalyst, in particular a platinum catalyst, are added to the reaction mixture containing the siloxanes according to the invention or first the branching catalyst is separated, for example by precipitation and filtering off, from the reaction mixture obtained according to the invention and then the substrate (E-A-B-L) to be hydrolyzed and a suitable hydrosilylation catalyst, in particular a platinum catalyst, are added.

The preparation of such branched siloxanes is also possible by direct addition of a substrate (E-A-B-L) to be hydrolyzed and of a suitable hydrosilylation catalyst to the reaction mixture right at the beginning of the reaction of polysiloxanes containing straight-chain silane hydrogen in the presence of carboxylates as a catalyst.

The siloxanes according to the invention, in particular those which have the radicals -A-B-L, can be used in particular in the preparation of polyurethane foams, preferably as a foam stabilizer, and for the preparation of antifoam formulations.

In the examples shown below, the present invention is described by way of example without being intended to limit the invention, whose range of applications is evident from the entire description and the claims, to the embodiments mentioned in the examples.

WORKING EXAMPLES

Catalyst

The catalyst used in examples 1 to 5, cesium laurate, was prepared as follows:

In a 500 ml three-necked flask which is equipped with a stirrer, a jacketed coil condenser and a thermometer, 20 g of lauric acid (from Merck) were dissolved in 60 ml of methanol at 50° C. At 50° C., 16.3 g of cesium carbonate (from Aldrich) were introduced in portions in the course of 70 min, gas evolution taking place. Stirring was effected for a further 4 h under reflux and the reaction mixture obtained was then freed from the solvent on a rotary evaporator. 32.2 g of a colorless solid were obtained.

Reaction Procedure:

All reactions were carried out under inert gas (nitrogen). Dimethylsilane, trimethylsilane, low molecular weight siloxanes and hydrogen were formed in the reaction and were removed via a cold trap.

Analyses:

The conversion was determined by determining the residual SiH functions by means of a gas volumetric hydrogen determination [conversion stated in %; SiH value in eq/kg of test substance]. The presence of the T-units was demonstrated in each case by a $^{29}$Si-NMR spectroscopic investigation of the reaction product.

M-units=$R_3SiO_{1/2}$,
M'-units=$R_2(H)SiO_{1/2}$,
D-units=$R_2SiO_{2/2}$,
D'=$R(H)SiO_{2/2}$,
T-units=$RSiO_{3/2}$.

Example 1

Reaction of a Siloxane Having the Average Structure $(CH_3)_3SiO-[(CH_3)_2SiO]_{20}-[(CH_3)HSiO]_5-Si(CH_3)_3$ with Cesium Laurate 40.5 g of the siloxane were initially introduced into a 250 ml three-necked flask which was equipped with a stirrer, a jacketed coil condenser and a thermometer. At 50° C., 0.2 g of cesium laurate was added, the temperature was then increased to 130° C. and stirring was then effected for a further 1 h at 130° C. The gas volumetric hydrogen determination gave a 21% decrease in silane hydrogen. A pale yellow, viscous product was obtained, the $^{29}$Si-NMR spectrum of which (prepared using a Brucker AVANCE 400 NMR spectrometer with XWIN-NMR 3.1 evaluation software and tetramethylsilane as an internal standard) shows signals of the chemical shifts of 10 to 7 ppm (M-units; 6.5% of the total signal intensity), −5 to −7 ppm (M'-units; 5.1% of the total signal intensity), −18 to −23 ppm (D-units; 72.7% of the total signal intensity), −35 to −38 ppm (D'-units; 6.4% of the total signal intensity) and −63 to −69 ppm (T-units; 9.3% of the total signal intensity).

Example 2

Reaction of a Siloxane Having the Average Structure $(CH_3)_3SiO-[(CH_3)_2SiO]_{20}-[(CH_3)HSiO]_5-Si(CH_3)_3$ with Cesium Laurate and Subsequent Hydrosilylation Reaction 40.5 g of the siloxane were initially introduced into a 250 ml three-necked flask which was equipped with a stirrer, a jacketed coil condenser, a dropping funnel and a thermometer. At 50° C., 0.2 g of cesium laurate was added, the temperature was increased to 130° C. and stirring was effected for a further 1 h at 130° C. The gas volumetric hydrogen determination gave a 21% decrease in silane hydrogen. The reaction mixture was cooled to 88° C. and a Karstedt catalyst (platinum-divinyltetramethyldisiloxane complex from ABCR, 15 ppm by mass of platinum, based on the total weight of the batch) was added. At 88° C., 88 g of a pure propylene oxide-containing polyether initiated with allyl alcohol and with methyl endcapping (with an average molar mass of 1000 g/mol) were added dropwise. Thereafter, stirring was effected for a further 1.5 h at 88° C. and the mixture was then cooled to room temperature. The catalyst cesium laurate was filtered off. A pale yellow, viscous product was obtained, the $^{29}$Si-NMR spectrum of which (recorded as described in example 1) shows signals of the chemical shifts of 9 to 7 ppm (M-units; 13.2% of the total signal intensity), −19 ppm (cyclic D-units; 5.0% of the total signal intensity), −21 to −23 ppm (D-units; 71.7% of the total signal intensity) and −65 to −70 ppm (T-units; 10.1% of the total signal intensity).

Example 3

Reaction of an Organomodified Siloxane with Cesium Laurate 70 g of a polyether initiated with allyl alcohol, containing ethylene oxide (EO) and propylene oxide (PO) and with methyl endcapping (average molar mass of 1100 g/mol, about 60% of EO, about 40% of PO) were initially introduced into a 250 ml three-necked flask which is equipped with a stirrer, a jacketed coil condenser, a dropping funnel and a thermometer, and a Karstedt catalyst (platinum-divinyltetramethyldisiloxane complex from ABCR, 8 ppm by mass of platinum, based on the total weight of the batch) was added at 70° C. Thereafter, 36.4 g of a siloxane having the average structure $(CH_3)_3SiO—[(CH_3)_2SiO]_{40}—[(CH_3)HSiO]_3—Si(CH_3)_3$ were added dropwise at 70° C. and stirring was effected for a further 2 h. Thereafter, 0.5 g of cesium laurate was added and the reaction mixture was heated to 130° C. At this temperature, stirring was effected for a further 4 h. The gas volumetric hydrogen determination showed 98% consumption of silane hydrogen. After cooling to room temperature, the catalyst cesium laurate was filtered off. A pale yellow, viscous product was obtained, the $^{29}$Si-NMR spectrum of which (recorded as described in example 1) shows signals of the chemical shifts of 9 to 7 ppm (M-units; 5.0% of the total signal intensity), −19 ppm (cyclic D-units; 9.3% of the total signal intensity), −21 to −23 ppm (D-units; 82.6% of the total signal intensity) and −65 to −68 ppm (T-units; 3.1% of the total signal intensity).

Example 4

Reaction of an Organomodified Siloxane with Potassium Laurate 80 g of a polyether initiated with allyl alcohol, containing ethylene oxide (EO) and propylene oxide (PO) and with methyl endcapping (average molar mass of 1100 g/mol, about 60% of EO, about 40% of PO) and 19.5 g of a siloxane having the average structure $(CH_3)_3SiO—[(CH_3)_2SiO]_{30}—[(CH_3)HSiO]_{10}—Si(CH_3)_3$ were initially introduced into a 250 ml three-necked flask which is equipped with a stirrer, a jacketed coil condenser and a thermometer and a Karstedt catalyst (platinum-divinyltetramethyldisiloxane complex from ABCR, 8 ppm by mass of platinum, based on the total weight of the batch) was added at 52° C. Stirring was effected for a further 2 h at 70° C. Thereafter, 0.5 g of potassium laurate was added and the reaction mixture was heated to 130° C. Stirring was effected for a further 8 h at 130° C. and 2 h at 140° C. Thereafter, a further 11 g of the polyether were added and stirring was effected for a further 2 h at 100° C. The gas volumetric hydrogen determination showed a 96% consumption of silane hydrogen. After cooling to room temperature, the catalyst potassium laurate was filtered off. A pale yellow, viscous product was obtained, the $^{29}$Si-NMR spectrum of which (recorded as described in example 1) shows signals of the chemical shifts of 7 ppm (M-units; 4.6% of the total signal intensity), −19 to −24 ppm (D-units; 91.4% of the total signal intensity) and −64 to −70 ppm (T-units; 4.0% of the total signal intensity).

Example 5

Reaction of a Siloxane Having the Average Structure $(CH_3)_3SiO—[(CH_3)_2SiO]_{20}—[(CH_3)HSiO]_5—Si(CH_3)_3$ with Cesium Laurate 430 g of a polyether initiated with allyl alcohol, containing pure propylene oxide (PO) and with methyl endcapping (average molar mass of 1000 g/mol) were heated to 70° C. in a 1000 ml three-necked flask which is equipped with a stirrer, a jacketed coil condenser and a thermometer and a Karstedt catalyst (platinum-divinyltetramethyldisiloxane complex from ABCR, 8 ppm by mass of platinum, based on the total weight of the batch) was added. At 70° C., 171 g of a siloxane having the average structure $(CH_3)_3SiO—[(CH_3)_2SiO]_{30}—[(CH_3)HSiO]_{10}—Si(CH_3)_3$ were added dropwise. After 2 h, the temperature was increased from 70 to 130° C., and 3 g of cesium laurate were added. After a further 2.5 h, a further 1.5 g of cesium laurate were added and stirring was effected for a further 11 h at 140° C. The gas volumetric hydrogen determination showed 99% consumption of silane hydrogen. After cooling to room temperature, the catalyst cesium laurate was filtered off. A pale yellow, viscous product was obtained, the $^{29}$Si-NMR spectrum of which (recorded as described in example 1) shows signals of the chemical shifts of 7 ppm (M-units; 6.7% of the total signal intensity), −19 to −23 ppm (D-units; 90.0% of the total signal intensity) and −63 to −69 ppm (T-units; 3.3% of the total signal intensity).

Preparation of a Mixture of Cesium Laurate and Lauric Acid for Example 6

In a 500 ml three-necked flask which is equipped with a stirrer, a jacketed coil condenser and a thermometer, 81.5 g of cesium carbonate (from Aldrich) were dissolved in 300 g of ethanol at 50° C. At 50° C., 200 g of lauric acid (from Merck) were introduced in portions in the course of 3.5 h, gas evolution taking place. Stirring was effected for a further 2.5 h at 70° C. and the mixture was then freed from the solvent on a rotary evaporator. 265 g of a colorless mixture of cesium laurate and lauric acid were obtained.

Example 6

Reaction of an Organomodified Siloxane with Cesium Laurate in the Presence of the Free Carboxylic Acid Lauric Acid 80.4 g of a polyether initiated with allyl alcohol, containing ethylene oxide (EO) and propylene oxide (PO) and with methyl endcapping (average molar mass of 1100 g/mol, about 60% of EO, about 40% of PO) and 19.5 g of a siloxane having the average structure $(CH_3)_3SiO—[(CH_3)_2SiO]_{30}—[(CH_3)HSiO]_{10}—Si(CH_3)_3$ were initially introduced into a 250 ml three-necked flask which is equipped with a stirrer, a jacketed coil condenser and a thermometer and a Karstedt catalyst (platinum-divinyltetramethyldisiloxane complex from ABCR, 4 ppm by mass of platinum, based on the total weight of the batch) was added at 70° C. Stirring was effected for 2 h at 70° C. Thereafter, 0.5 g of the cesium laurate/lauric acid mixture was added and the reaction mixture was heated to 130° C. At this temperature, stirring was effected for a further 4 h at 130° C. The gas volumetric hydrogen determination showed 98% consumption of silane hydrogen. After cooling to room temperature, the catalyst mixture was filtered off. A pale yellow, viscous product was obtained, the $^{29}$Si-NMR spectrum of which (recorded as described in example 1) shows signals of the chemical shifts of 7 ppm (M-units; 4.4% of the total signal intensity), —19 ppm (cyclic D-units; 6.0% of the total signal intensity), −20 to −23 ppm (D-units; 84.64% of the total signal intensity) and −65 to −68 ppm (T-units; 5.0% of the total signal intensity).

Use Example 1

Stabilization of Rigid Polyurethane Foams

Foam-stabilizing additives which ensure a fine-cell, uniform foam structure with few defects and hence positively influence the performance characteristics—in particular thermal insulation capability—of the rigid foam are used in the preparation of rigid polyurethane and polyisocyanurate foams. Surfactants based on polyether-modified siloxanes are particularly effective and are therefore the preferred type of cell stabilizers. Since there is a multiplicity of different rigid foam formulations for different fields of use, which set individual requirements as regards the foam stabilizer, polyethersiloxanes of different structure are used. In many fields of use, improvements of the foam stabilizers compared with the prior art are desirable in order to either optimize the performance characteristics of the rigid foams, in particular with regard to the thermoconductivity and the foam defects at the surface of the foams. Further criteria which are important in the preparation of rigid foams are the flowability and volume yield of the foam in the case of a given formulation and amount of blowing agent. These parameters, too, can be positively influenced by the choice of an optimized stabilizer. The branched polyorganosiloxanes according to the invention are suitable for use as a foam stabilizer in rigid polyurethane and polyisocyanurate forms, as shown by a comparison of performance characteristics with conventional, straight-chain polyethersiloxanes which represent the prior art.

A typical formulation for the preparation of rigid polyurethane or polyisocyanurate foams is based on one or more organic isocyanates having two or more isocyanate functions, one or more polyols having two or more groups reactive toward isocyanate, catalysts for the isocyanate-polyol and/or isocyanate-water reactions and/or the isocyanate trimerization, polyethersiloxane foam stabilizers, water, optionally physical blowing agents, optionally flameproofing agents and, if appropriate, further additives. For the comparison of performance characteristics of foam stabilizers according to the invention and conventional foam stabilizers, the following foam formulation was used:

| Component | Amount used |
| --- | --- |
| polyetherpolyol* | 95 g (100 parts) |
| N,N-dimethylcyclohexyl-amine (DMCHA) | 1.4 g (1.5 parts) |
| water | 2.5 g (2.6 parts) |
| cyclopentane | 12.4 g (13.1 parts) |
| stabilizer | 1.4 g (1.5 parts) |
| methylenediphenyl 4,4'-diisocyanate (MDI)** | 188.6 g (198.5 parts) |

*Daltolac R 471 from Huntsman
**Polymeric MDI, 200 mPa · s, 31.5% NCO, functionality 2.7

The comparative foamings were carried out by the manual mixing method. For this purpose, polyol, catalysts, water, conventional foam stabilizer or foam stabilizer according to the invention and blowing agent were weighed into a beaker and mixed with a disk stirrer (6 cm diameter) for 30 s at 1000 rpm. The amount of blowing agent which had evaporated during the mixing process was determined by reweighing and was replenished. The MDI was now added, and the reaction mixture was stirred with the stirrer described for 5 s at 3000 rpm and immediately transferred to a 145 cm×14 cm×3.5 cm aluminum mold which was thermostatted at 45° C., inclined at an angle of 100 (along the side measuring 145 cm) and lined with the polyethylene film. The foam formulation was introduced at the lower side so that the expanding foam fills the mold in the gate region and rises in the direction of the higher side. The amount of foam formulation used was such that it was below the amount required for minimum filling of the mold. The length of the shaped foam article obtained after curing—standardized to the weight—can thus be used as a measure of the volume yield. After 10 min, the foams were removed from the mold and analyzed. Surface and internal defects were assessed subjectively on the basis of a scale from 1 to 10, 10 representing a defect-free foam and 1 the foam having an extremely high level of defects. The pore structure (cell fineness, average number of cells per 1 cm) was assessed visually on a cut surface by comparison with internally produced comparative foams. The flow length (as a measure of the volume yield) was determined by measuring the shaped foam article and was converted to a standard weight of 260 g and standard pressure for better comparison according to the following formula:

reduced flow length=foam length·260 g·air pressure/(foam weight·1013 mbar)

All cell stabilizers used and the associated foaming results are listed in table 1.

TABLE 1

| Cell stabilizer | Foam quality regarding defects | | | Cell fineness [cells/cm] | Reduced flow length [cm] |
| --- | --- | --- | --- | --- | --- |
| | Top | Bottom | Internal | | |
| TEGOSTAB B 8443* | 4 | 4 | 8 | 36-40 | 132.0 |
| TEGOSTAB B 8462* | 4 | 4 | 7.5 | 36-40 | 131.4 |
| example 1 | 6 | 4 | 6.5 | 36-40 | 129.3 |
| example 2 | 5 | 5.5 | 6.5 | 36-40 | 131.6 |
| example 3 | 4.5 | 4.5 | 7.5 | 30-34 | 130.3 |

*Polyethersiloxane cell stabilizer for rigid polyurethane foam applications from Degussa The results show that rigid foams can be prepared using the branched polyethersiloxanes according to the invention. Compared with the conventional polyether-siloxanes known from the prior art, equally good results are achieved with regard to cell fineness, flowability and volume yield and even better results with regard to the surface quality.

Use Example 2

Use as Oil Component in Antifoam Formulations

In many aqueous applications, surfactants are used as auxiliaries, for example as wetting agents, detergents, dispersants, emulsifiers. Frequently, however, the use of surfactants leads to troublesome development of foam. This development of foam is as a rule suppressed by addition of an antifoam. The antifoams frequently consist of a dispersion of finely divided, hydrophobic particles in a water-insoluble oil.

In order to test whether branched polyethersiloxanes prepared according to the invention can be used as an oil component in antifoam preparations, a formulation having the following composition was prepared: 96.5 parts by weight of the branched polyethersiloxane prepared according to example 5 and 3.5 parts by weight of finely divided silica.

The finely divided silica used in the formulation (A) was a water-repellent pyrogenic silica having a BET surface area (surface area determined by the Brunauer, Emmett and Teller method familiar to the person skilled in the art) of 110 m$^2$/g and that in the formulation (B) was a water-repellent precipitated silica having a BET surface area of 90 m$^2$/g. They were incorporated into the siloxane in each case with the aid of a high-speed stirrer with a turbine for 1 h.

The defoaming effect of these preparations was determined. For this purpose, 2% by weight of antifoam were incorporated for 10 minutes using a magnetic stirrer into the surfactant concentrate to be tested in each case. A 0.2% strength by weight aqueous solution of this surfactant/antifoam mixture was then prepared, which corresponds to a content of 40 ppm by mass of antifoam in the surfactant solution. In a 2 l measuring cylinder, a fine airstream was passed via a glass frit of porosity 1 through 11 of the surfactant solution at a constant 6 l/min. The volume of the foam formed thereby was monitored and the experiment was terminated on reaching 1000 ml foam volume and the time elapsed was noted. If the foam volume did not reach 1000 ml within 30 min, the experiment was stopped and the resulting foam volume was noted. The experiments were carried out at room temperature and at 60° C.

Table 2 below summarizes the results. Surfactant concentrate T1 is a 75% strength by weight solution of a sodium diisooctyl sulfosuccinate (REWOPOL® SB DO 75, from Goldschmidt GmbH), and T2 is polyoxyethylene-(6) isotridecyl alcohol (TEGO® alkanol TD6, from Goldschmidt GmbH).

TABLE 2

Results in use example 2

| Surfactant concentrate | Formulation | Defoaming room temperature | Defoaming 60° C. |
|---|---|---|---|
| T1 | Surfactant without antifoam | 12 s | 12 s |
| T1 | A | 30 min: 800 ml | 30 min: 800 ml |
| T1 | B | 30 min: 800 ml | 30 min: 750 ml |
| T2 | Surfactant without antifoam | 57 s | 60 s |
| T2 | A | 199 s | 30 min: 200 ml |
| T2 | B | 104 s | 30 min: 150 ml |

The results of table 2 show that antifoam preparations which substantially inhibit foam formation in comparison with surfactant solutions without addition of an antifoam can be prepared with the branched polyethersiloxanes according to the invention.

Having thus described in detail various embodiments of the present invention, it is to be understood that many apparent variations thereof are possible without departing from the spirit or scope of the present invention.

The invention claimed is:

1. A process for the preparation of branched polysiloxanes, which comprises reaction of a straight-chain polyorganosiloxane of general formula (I)

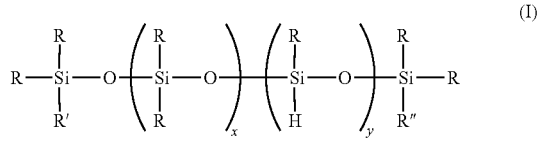

in which

R are one or more, identical or different radicals selected from linear, cyclic or branched, saturated, mono- or polyunsaturated and/or aromatic hydrocarbon radicals having up to 200 carbon atoms, which may optionally carry one or more substituents selected from the group which consists of an optionally substituted heterocyclic group preferably containing one or more nitrogen atoms, amino, alkylamino, dialkylamino, ammonium, polyether, polyester and polyether ester radicals which may optionally contain one or more groups selected from —O—, —NR$^1$—, —C(O)—, —C(S)—, —C(O)O—, C(O)OH, —C(O)NH— and —C(O)NR$^2$—, —SO$_3$H, —SO$_3^{-1}$/$_w$M$^{w+}$, —OSO$_3$H, —OSO$_3^{-1}$/$_w$M$^{w+}$, —PO$_3^{2-2}$/$_w$M$^{w+}$, —PO$_3$H$^{-1}$/$_w$M$^{w+}$, —PO$_3$H$_2$, —OPO$_3^{2-2}$/$_w$M$^{w+}$, —OPO$_3$H$^{-1}$/$_w$M$^{w+}$, —OPO$_3$H$_2$, in which R$^1$ is hydrogen or a straight-chain, cyclic or branched, saturated, unsaturated and/or aromatic, optionally bridged hydrocarbon radical having up to 50 carbon atoms, which may contain one or more groups selected from —O— and —C(O)— and in which R$^2$ is a monovalent, straight-chain, cyclic or branched, saturated, unsaturated and/or aromatic hydrocarbon radical having up to 100 carbon atoms, which may contain one or more groups selected from —O—, —NR$^1$—, —C(O)— and —C(S)—, —C(O)O—, and —C(O)NH—, and in which M$^{w+}$ is a w-valent cation where w=1, 2, 3 or 4, in particular K$^+$, Na$^+$, NH$_4^+$, (i-C$_3$H$_7$)NH$_3^+$ or (CH$_3$)$_4$N$^+$, R' and R", independently of one another, are H or R, x is an integer from 1 to 200, y is an integer from 1 to 100, in the presence of ammonium or metal carboxylates as a catalyst to afford a branched polysiloxane which contains at least one RSiO$_{3/2}$ unit, wherein the reaction is performed in the absence of hydroxy-functional organic compounds.

2. The process as claimed in claim 1, wherein compounds of the general formula (I), in which R are methyl groups, are used as the straight-chain polyorganosiloxane.

3. The process as claimed in claim 2, wherein compounds of the general formula (III)

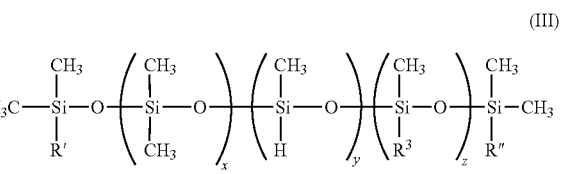

in which

R$^3$, in each case independently of one another, are a group A-B-C,

A being a divalent group selected from linear or branched, saturated or mono- or polyunsaturated alkyl, aryl, alkylaryl or arylalkoxy groups having 1 to 20 carbon atoms, B being a group of the general formula (IV)

—(C$_2$H$_4$O)$_n$(C$_3$H$_6$O)$_o$(C$_{12}$H$_{24}$O)$_p$(C$_8$H$_8$O)$_q$(C$_4$H$_8$O)$_r$—  (IV)

where n, o, p, q and r, independently of one another, are integers from 0 to 50 and, if more than one of the indices n, o, p, q, r>0, the general formula IV represents a random oligomer or a block oligomer, C being selected from the group consisting of linear or branched, saturated or mono- or polyunsaturated alkyl, aryl, alkylaryl or arylalkyl groups having 1 to 12 carbon atoms or acetoxy groups, R' and R", independently of one another, are H or R$^3$, x is an integer from 1 to 200, y is an integer from 1 to 100, are used as the straight-chain polyorganosiloxane.

4. The process as claimed in claim 3, wherein the catalyst used is at least one compound of the general formula (V)

R$^4$—C(O)O$^{-1}$/$_u$G$^{u+}$  (V)

in which

R⁴ is selected from hydrogen or linear, cyclic or branched, saturated, mono- or polyunsaturated and/or aromatic hydrocarbon radicals having up to 30 carbon atoms and $G^{u+}$ is a u-valent cation with u=1, 2, 3 or 4, in particular ammonium ion, alkali metal or alkaline earth metal cations, very particularly $K^+$, $Na^+$ or $Cs^+$.

5. The process as claimed in claim 4, wherein the catalyst used is at least one salt of the following carboxylic acids:

formic acid, acetic acid, propionic acid, butyric acid, valeric acid, caproic acid, heptanoic acid, caprylic acid, nonanoic acid, capric acid, undecanoic acid, lauric acid, myristic acid, palmitic acid, stearic acid, arachidic acid, behenic acid, cyclopentanecarboxylic acid, cyclo-hexanecarboxylic acid, acrylic acid, methacrylic acid, vinylacetic acid, crotonic acid, 2-/3-/4-pentenoic acid, 2-/3-/4-/5-hexenoic acid, lauroleic acid, myristoleic acid, palmitoleic acid, oleic acid, gadoleic acid, sorbic acid, linoleic acid, linolenic acid, pivalic acid, ethoxyacetic acid, phenylacetic acid, lactic acid, 2-ethylhexanoic acid, oxalic acid, malonic acid, succinic acid, tartaric acid, glutaric acid, adipic acid, pimelic acid, suberic acid, azelaic acid, sebacic acid, benzoic acid, o-/m-/p-toluic acid, salicylic acid, 3-/4-hydroxybenzoic acid, phthalic acids or the completely or partly hydrogenated derivatives thereof, such as hexahydro- or tetrahydro-phthalic acid, or mixtures thereof.

6. The process as claimed in claim 5, wherein the catalyst used is at least one alkali metal or alkaline earth metal salt of caproic acid, caprylic acid, capric acid, lauric acid, myristic acid, palmitic acid, stearic acid, arachidic acid and/or behenic acid.

7. The process as claimed in claim 6, wherein the catalyst used is at least one potassium or cesium salt of a carboxylic acid.

8. The process as claimed in claim 7, wherein the catalyst used is potassium laurate or cesium laurate.

9. The process as claimed in claim 1, wherein first straight-chain polyorganosiloxanes containing silane hydrogen in the polymer chain are reacted, siloxanes which have groups carrying silane hydrogen still remaining in the reaction mixture, which siloxanes are reacted in a second process step in the course of a transition metal-catalyzed hydrosilylation reaction with one or more compounds E-A-B-L, where E is a monovalent group selected from —CH=CH₂ and —C≡CH and L is a hydrogen atom or the radical C, wherein A is a divalent group selected from linear or branched, saturated or mono- or polyunsaturated alkyl, aryl, alkylaryl, arylalkoxy groups having 1 to 20 carbon atoms, B is a group of the general formula (IV)

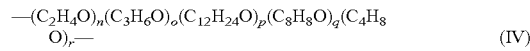

$$—(C_2H_4O)_n(C_3H_6O)_o(C_{12}H_{24}O)_p(C_8H_8O)_q(C_4H_8O)_r— \quad (IV)$$

wherein n, o, p, q and r, independently of one another, are integers from 0 to 50 and, if more than one of the indices n, o, p, q, r are greater than zero, the general formula IV represents a random oligomer or a block oligomer, C is selected from the group consisting of linear or branched, saturated or mono- or polyunsaturated alkyl, aryl, alkylaryl or arylalkyl groups having 1 to 12 carbons atoms or acetoxy groups.

10. The process as claimed in claim 1, wherein the catalysts are used homogeneously or heterogeneously.

11. The process as claimed in claim 1, wherein the reaction is carried out in the absence of a solvent.

12. The process as claimed in claim 3, wherein the reaction is carried out in the absence of a solvent.

13. The process as claimed in claim 12, wherein the catalyst used is at least one potassium or cesium salt of a carboxylic acid.

14. The process as claimed in claim 13, wherein the catalyst used is potassium laurate or cesium laurate.

* * * * *